United States Patent
Wen et al.

(10) Patent No.: US 9,756,306 B2
(45) Date of Patent: Sep. 5, 2017

(54) ARTIFACT REDUCTION METHOD AND APPARATUS AND IMAGE PROCESSING METHOD AND APPARATUS

(71) Applicant: Novatek Microelectronics Corp., Hsinchu (TW)

(72) Inventors: Shih-Sung Wen, Hsinchu County (TW); Chih-Chia Kuo, Hsinchu County (TW)

(73) Assignee: Novatek Microelectronics Corp., Hsinchu (TW)

( * ) Notice: Subject to any disclaimer, the term of this patent is extended or adjusted under 35 U.S.C. 154(b) by 639 days.

(21) Appl. No.: 14/201,938

(22) Filed: Mar. 10, 2014

(65) Prior Publication Data
US 2015/0256804 A1    Sep. 10, 2015

(51) Int. Cl.
| G06T 5/00 | (2006.01) |
| H04N 9/64 | (2006.01) |
| H04N 9/77 | (2006.01) |
| H04N 5/21 | (2006.01) |

(52) U.S. Cl.
CPC ............. H04N 9/646 (2013.01); G06T 5/002 (2013.01); H04N 5/21 (2013.01); H04N 9/77 (2013.01)

(58) Field of Classification Search
CPC ................. G06T 5/002; G06T 2207/20182
See application file for complete search history.

(56) References Cited

U.S. PATENT DOCUMENTS

| 5,929,936 A | * | 7/1999 | Arai | ...................... H04N 19/80 |
| | | | | 348/607 |
| 7,944,508 B1 | | 5/2011 | Chou | |

OTHER PUBLICATIONS

Lee et al., "Reduction of Dot Crawl and Rainbow Artifacts in the NTSC Video," IEEE Transactions on Consumer Electronics, May 2007, pp. 740-748, vol. 53, No. 2.
Lee, "Blind Cross Color Noise Detection and Reduction," IEEE Transactions on Consumer Electronics, Nov. 2008, pp. 1825-1829.

* cited by examiner

*Primary Examiner* — Brian P Werner
(74) *Attorney, Agent, or Firm* — Jianq Chyun IP Office

(57) ABSTRACT

Artifact reduction method and apparatus, and image processing method and apparatus are provided. The artifact reduction apparatus includes a scaling-down unit, a buffer unit, an artifact detection unit, a scaling-up unit and a filter unit. The scaling-down unit scales down a resolution of a current original image frame to obtain a current low-resolution image frame. The artifact detection unit performs an artifact detection to the current low-resolution image frame to obtain low-resolution weights in accordance with a relation of the current low-resolution image frame and a previous low-resolution image frame provided by the buffer unit. The scaling-up unit scales up a number of the low-resolution weights to obtain a high-resolution weights. By using the high-resolution weights, the filter unit performs an image processing procedure to the current original image frame for reducing artifact of the current original image frame and obtaining an adjusted image frame.

9 Claims, 4 Drawing Sheets

ARTIFACT REDUCTION METHOD AND APPARATUS AND IMAGE PROCESSING METHOD AND APPARATUS

BACKGROUND OF THE INVENTION

Field of the Invention

The invention relates to an image processing apparatus, and more particularly, to artifact reduction method and apparatus and image processing method and apparatus.

Description of Related Art

Composite video systems (e.g., NTSC or PAL) transmit color information through color sub-carriers superimposed on luminance signals. Generally, luminance signals and chrominance signal share frequency bands commonly in practical uses. As a result, two types of artifacts (e.g., cross-chroma and cross-luma) are usually found in composite videos.

When a frequency component of the luminance signal is close to a frequency of the color sub-carrier, a cross-chroma may occur to cause generation of color noise in frames. The cross-chroma may sometimes be referred to as bleeding or rainbow effects. Cross-luma occurs nearby edges with highly saturated color, and acts like a series of crawling dots (or also known as dot crawls). Cross-luma often results in color information being confused with brightness information. For viewers, artifacts like cross-luma in stationary areas are quite obvious and annoying.

SUMMARY OF THE INVENTION

An artifact reduction method is disclosed according to embodiments of the invention, including: scaling down a resolution of a current original image frame from a first resolution to a second resolution to obtain a current low-resolution image frame, wherein the current original image frame and the current low-resolution image frame include a first plurality of pixels and a second plurality of pixels, respectively; performing an artifact detection to the current low-resolution image frame to obtain a plurality of low-resolution weights, wherein the low-resolution weights are respectively corresponding to the second plurality of pixels of the current low-resolution image frame; scaling up a number of the low-resolution weights to generate a plurality of high-resolution weights, wherein the high-resolution weights are respectively corresponding to the first plurality of pixels of the current original image frame; and performing a temporal noise reduction to the current original image frame by using the high-resolution weights for reducing artifact of the current original image frame and obtaining an adjusted image frame.

An image processing method is disclosed according to embodiments of the invention, including: scaling down a resolution of a current original image frame from a first resolution to a second resolution to obtain a current low-resolution image frame, wherein the current original image frame and the current low-resolution image frame include a first plurality of pixels and a second plurality of pixels, respectively; generating a plurality of low-resolution weights according to the current low-resolution image frame, wherein the low-resolution weights are respectively corresponding to the second plurality of pixels of the current low-resolution image frame; scaling up a number of the low-resolution weights to generate a plurality of high-resolution weights, wherein the high-resolution weights are respectively corresponding to the first plurality of pixels of the current original image frame; and performing an image processing procedure to the current original image frame by using the high-resolution weights to obtain an adjusted image frame.

The artifact reduction apparatus is disclosed according to embodiments of the invention, including a scaling-down unit, a buffer unit, an artifact detection unit, a scaling-up unit and a filter unit. The scaling-down unit scales down a resolution of a current original image frame from a first resolution to a second resolution to obtain and output a current low-resolution image frame, wherein the current original image frame and the current low-resolution image frame include a first plurality of pixels and a second plurality of pixels, respectively. The buffer unit is coupled to the scaling-down unit to receive and store the current low-resolution image frame. The artifact detection unit is coupled to the scaling-down unit and the buffer unit. The artifact detection unit performs an artifact detection to the current low-resolution image frame to obtain and output a plurality of low-resolution weights in accordance with a relation of the current low-resolution image frame provided by the scaling-down unit and at least one previous low-resolution image frame provided by the buffer unit, wherein the low-resolution weights are respectively corresponding to the second plurality of pixels of the current low-resolution image frame. The scaling-up unit is coupled to the artifact detection unit. The scaling-up unit scales up a number of the low-resolution weights to obtain and output a plurality of high-resolution weights, wherein the high-resolution weights are respectively corresponding to the first plurality of pixels of the current original image frame. The filter unit is coupled to the scaling-up unit. The filter unit performs an image processing procedure to the current original image frame by using the high-resolution weights for reducing artifact of the current original image frame and obtaining an adjusted image frame.

An image processing apparatus is disclosed according to embodiments of the invention, including a scaling-down unit, a weight generation unit, a scaling-up unit and an adjusting unit. The scaling-down unit scales down a resolution of a current original image frame from a first resolution to a second resolution to obtain a current low-resolution image frame. The current original image frame and the current low-resolution image frame include a first plurality of pixels and a second plurality of pixels, respectively. The weight generation unit generates a plurality of low-resolution weights according to the current low-resolution image frame. The low-resolution weights are respectively corresponding to the second plurality of pixels of the current low-resolution image frame. The scaling-up unit scales up a number of the low-resolution weights to generate a plurality of high-resolution weights. The high-resolution weights are respectively corresponding to the first plurality of pixels of the current original image frame. The adjusting unit performs an image processing procedure to the current original image frame by using the high-resolution weights to obtain an adjusted image frame.

To make the above features and advantages of the disclosure more comprehensible, several embodiments accompanied with drawings are described in detail as follows.

DESCRIPTION OF THE EMBODIMENTS

Figure 1:
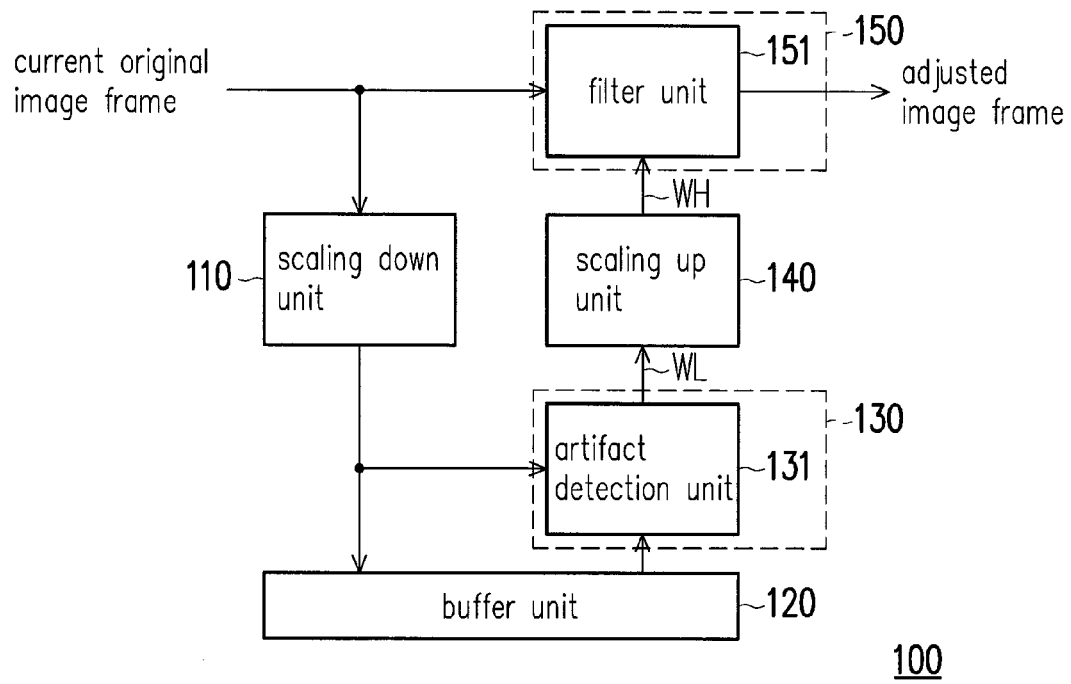
FIG. 1 is a block diagram illustrating circuitry of an artifact reduction apparatus according to an embodiment of the invention.

The term "coupling/coupled" used in this specification (including claims) may refer to any direct or indirect connection means. For example, "a first device is coupled to a second device" should be interpreted as "the first device is directly connected to the second device" or "the first device is indirectly connected to the second device through other devices or connection means." Moreover, wherever appropriate in the drawings and embodiments, elements/components/steps with the same reference numerals represent the same or similar parts. Elements/components/steps with the same reference numerals or names in different embodiments may be cross-referenced.

FIG. 1 is a block diagram illustrating circuitry of an image processing apparatus (e.g., an artifact reduction apparatus 100) according to an embodiment of the invention. The artifact reduction apparatus 100 includes a scaling-down unit 110, a buffer unit 120, a weight generation unit 130, a scaling-up unit 140 and an adjusting unit 150. In the present embodiment, the weight generation unit 130 may include an artifact detection unit 131, and the adjusting unit 150 may include a filter unit 151. The scaling-down unit 100 and the filter unit 151 receive a current original image frame. The filter unit 151 of the adjusting unit 150 may perform an image processing procedure to the current original image frame for reducing artifact of the current original image frame, and obtaining and outputting an adjusted image frame.

Figure 2:
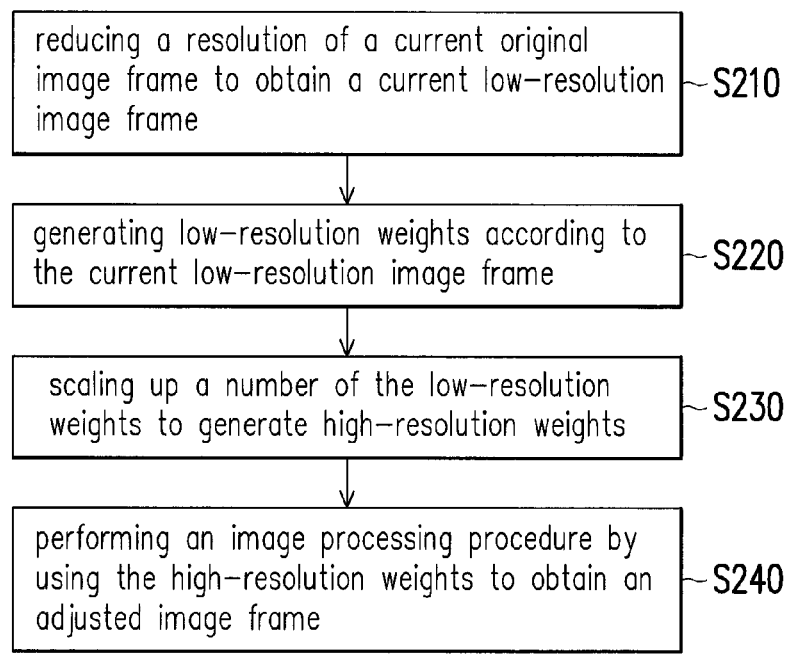
FIG. 2 is a flowchart illustrating an artifact reduction method according to an embodiment of the invention.

FIG. 2 is a flowchart illustrating an image processing method (e.g., an artifact reduction method) according to an embodiment of the invention. Referring to FIG. 1 and FIG. 2, in step S210, the scaling-down unit 110 scales down a resolution of the current original image frame from a first resolution to a second resolution to obtain a current low-resolution image frame to be outputted to the buffer unit 120 and the artifact detection unit 131 of the weight generation unit 130. For instance, the scaling-down unit 110 may scale down the resolution of the current original image frame from high-definition (HD) resolution or Full-HD resolution to standard-definition (SD) resolution (720*480i, 720*480p) or other resolutions.

The buffer unit 120 is coupled to the scaling-down unit 110 and used to receive and store the current low-resolution image frame provided by the scaling-down unit 110. The artifact detection unit 131 of the weight generation unit 130 is coupled to the scaling-down unit 110 and the buffer unit 120. In step S220, the artifact detection unit 131 of the weight generation unit 130 may generate a plurality of low-resolution weights WL for the scaling-up unit 140 according to the current low-resolution image frame provided by the scaling-down unit 110, wherein the low-resolution weights WL are respectively corresponding to a second plurality of pixels of the current low-resolution image frame. For instance, in step S220, the artifact detection unit 131 may perform an artifact detection to the current low-resolution image frame provided by the scaling-down unit 110, so as to obtain the low-resolution weights WL for the scaling-up unit 140. In case the current low-resolution image frame provided by the scaling-down unit 110 includes x*y pixels, the low-resolution weights WL may then include x*y weights. A bit depth of the low-resolution weights WL may be less than or equal to a bit depth of the current low-resolution image frame.

As another example, in step S220, the artifact detection unit 131 may perform the artifact detection to the current low-resolution image frame to obtain a plurality of low-resolution weights to be outputted to the scaling-up unit 140 in accordance with a relation of the current low-resolution image frame provided by the scaling-down unit 110 and at least one previous low-resolution image frame provided by the buffer unit 120. Take NTSC system as an example, the artifact detection unit 131 may perform the artifact detection to the current low-resolution image frame to obtain and output the low-resolution weights in accordance with a relation between the three of the current low-resolution image frame (e.g., a $k^{th}$ low-resolution image frame) provided by the scaling-down unit 110, and a second previous low-resolution image frame (e.g., a $(k-2)^{th}$ low-resolution image frame) and a fourth previous low-resolution image frame (e.g., a $(k-4)^{th}$ low-resolution image frame) provided by the buffer unit 120. Take PAL system as an example, the artifact detection unit 131 may perform the artifact detection to the current low-resolution image frame to obtain and output a plurality of low-resolution weights WL in accordance with a relation between the three of the current low-resolution image frame (e.g., a $k^{th}$ low-resolution image frame) provided by the scaling-down unit 110, and a fourth previous low-resolution image frame (e.g., a $(k-4)^{th}$ low-resolution image frame) and an eighth previous low-resolution image frame (e.g., a $(k-8)^{th}$ low-resolution image frame) provided by the buffer unit 120.

Each pixel in both the first plurality of pixels of the current original image frame and the second plurality of pixels of the current low-resolution image frame may include a brightness value and a color value. In some embodiments, in step S220, for each pixel in the second plurality of pixels of the current low-resolution image frame, the artifact detection unit 131 may respective execute following steps: (i) comparing a color or brightness value of a pixel of the current low-resolution image frame with a color or brightness value of the pixel of at least one previous low-resolution image frame; and (ii) based on a comparison result from step (ii), the artifact detection unit 131 may decide whether to adjust a color or brightness weight corresponding to the pixel in the low-resolution weights of the at least one previous low-resolution image frame, so as to generate a color or brightness weight corresponding to the pixel in the low-resolution weights WL of the current low-resolution image frame.

In some embodiments, the step (ii) may include: (a) if the comparison result satisfies a predetermined condition, the artifact detection unit 131 may adjust the color or brightness weight corresponding to the pixel in the low-resolution weights of the at least one previous low-resolution image frame to be served as the color or brightness weight corresponding to the pixel in the low-resolution weights WL of the current low-resolution image frame, and (b) if the comparison result does not satisfy the predetermined condition, the artifact detection unit 131 may reset the color or brightness weight corresponding to the pixel in the current low-resolution image frame to an initial value (e.g., 0 or other values).

Figure 3:
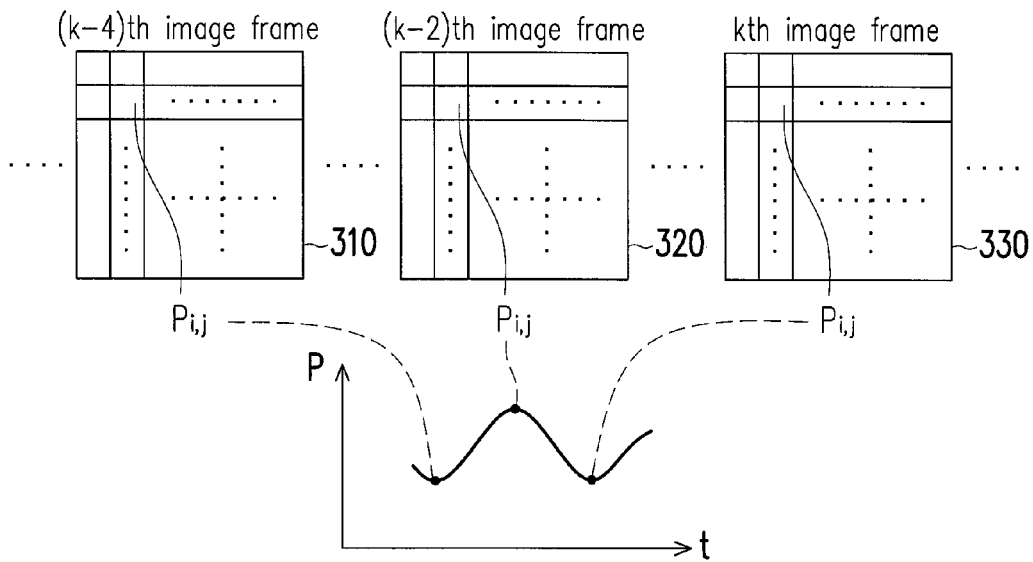
FIG. 3 is a schematic diagram illustrating operations of the artifact detection unit according to an embodiment of the invention.

Take NTSC system as an example, FIG. 3 is a schematic diagram illustrating operations of the artifact detection unit 131 according to an embodiment of the invention. Other embodiments regarding PAL system may be inferred by reference with related description of FIG. 3. In a curve diagram depicted at lower portion of FIG. 3, a horizontal axis represents a time t, and a vertical axis represents a pixel value P. Referring to FIG. 1 and FIG. 3, the artifact detection unit 131 may compare/analyze a relation between the three of a pixel in the current low-resolution image frame (e.g., a pixel $P_{i,j}$ with coordinates i,j in a $k^{th}$ low-resolution image frame 330) provided by the scaling-down unit 110, and the same pixel in a second previous low-resolution image frame (e.g., the pixel $P_{i,j}$ with coordinates i,j in a $(k-2)^{th}$ low-resolution image frame 320) and the same pixel in a fourth previous low-resolution image frame (e.g., the pixel $P_{i,j}$ with coordinates i,j in a $(k-4)^{th}$ low-resolution image frame 310) provided by the buffer unit 120. For instance, if the relation between the three of the pixel $P_{i,j}$ in the $(k-4)^{th}$ low-resolution image frame 310, the pixel $P_{i,j}$ in the $(k-2)^{h}$ low-resolution image frame 320 and the pixel $P_{i,j}$ in the $k^{th}$ low-resolution image frame 330 satisfies a sinusoid (as shown in FIG. 3), the artifact detection unit 131 may determine that the comparison result satisfies the predetermined condition.

Assuming that the pixels $P_{i,j}$ in the low-resolution image frames 310, 320 and 330 include a brightness value Y, the artifact detection unit 131 may check whether the comparison result of the brightness value Y of the pixels $P_{i,j}$ in the low-resolution image frames 310, 320 and 330 satisfies the predetermined condition (as shown in FIG. 3). Once the comparison result satisfies the predetermined condition, it indicates that cross-luma occurs at the pixel $P_{i,j}$ in the current low-resolution image frame (e.g., the $k^{th}$ image frame 330). Therefore, when the comparison result satisfies the predetermined condition, the artifact detection unit 131 may perform calculation of $WLY_{i,j}=WLY'_{i,j}+inc$, wherein $WLY_{i,j}$ is a brightness weight corresponding to the pixel $P_{i,j}$ in the current low-resolution image frame (the $k^{th}$ image frame 330), $WLY'_{i,j}$ is a brightness weight corresponding to the pixel $P_{i,j}$ in the previous low-resolution image frame (e.g., the $(k-2)^{th}$ low-resolution image frame 320), and inc is any real number greater than 0. In other embodiments, inc may be a real number greater than 0 and less than 1, so that the adjusted brightness weight $WLY_{i,j}$ may be less than or equal to 1. The brightness weight $WLY_{i,j}$ may be used as one of the low-resolution weights WL. Otherwise, if the comparison result does not satisfy the predetermined condition, the artifact detection unit 131 may perform calculation of $WLY_{i,j}=ini$, wherein ini is an initial value (e.g., 0 or other real numbers).

Assuming that the pixels $P_{i,j}$ in the low-resolution image frames 310, 320 and 330 include a color value C, the artifact detection unit 131 may check whether the comparison result of the color value C of the pixels $P_{i,j}$ in the low-resolution image frames 310, 320 and 330 satisfies the predetermined condition (as shown in FIG. 3). Once the comparison result satisfies the predetermined condition, it indicates that cross-color occurs at the pixel $P_{i,j}$ in the current low-resolution image frame 330. Therefore, when the comparison result satisfies the predetermined condition, the artifact detection unit 131 may perform calculation of $WLC_{i,j}=WLC'_{i,j}+inc$, wherein $WLC_{i,j}$ is a brightness weight corresponding to the pixel $P_{i,j}$ in the current low-resolution image frame, $WLC'_{i,j}$ is a brightness weight corresponding to the pixel $P_{i,j}$ in the previous low-resolution image frame (the $(k-2)^{th}$ low-resolution image frame 320), and inc is any real number greater than 0. In other embodiments, inc may be a real number greater than 0 and less than 1, so that the adjusted color weight $WLC_{i,j}$ may be less than or equal to 1. The color weight $WLC_{i,j}$ may be used as one of the low-resolution weights WL. Otherwise, if the comparison result does not satisfy the predetermined condition, the artifact detection unit 131 may perform calculation of $WLC_{i,j}=ini$, wherein ini is an initial value (e.g., 0 or other real numbers).

The scaling-up unit 140 is coupled to the artifact detection unit 131. In step S230, the scaling-up unit 140 may scale up a number (quantity) of the low-resolution weights to obtain and output a plurality of high-resolution weights WH. The high-resolution weights WH are respectively corresponding to the first plurality of pixels of the current original image frame. For instance, assuming that the current original image frame is of Full-HD resolution, the scaling-up unit 140 may scale up the number of the low-resolution weights WL by 1920*1080 to be served as the high-resolution weights WH. A bit depth of the high-resolution weights WH may be less than or equal to a bit depth of the current original image frame. For instance, the bit depth (or, a color depth) of the current original image frame may be 8 bits (or 10 bits or higher), and the bit depth of the high-resolution weights WH may be 4 bits (or less). The bit depth of the high-resolution weights WH may be decided based on actual design requirements.

The filter unit 151 of the adjusting unit 150 is coupled to the scaling-up unit 140. In step S240, the filter unit 151 of the adjusting unit 150 may perform an image processing procedure to the current original image frame by using the high-resolution weights WH for reducing artifact of the current original image frame and obtaining the adjusted image frame. For instance, the filter unit 151 may perform a temporal noise reduction (TNR) to the current original image frame by using the high-resolution weights WH for reducing artifact of the current original image frame and obtaining the adjusted image frame.

A composite-video may be demodulated for obtaining an original image with SD resolution. In some applications, the original image with SD resolution may be scaled up through postproduction into the current original image with HD resolution or other higher resolutions. Therefore, composite-video artifacts may be present in the current original image frame. After the scaling-down unit 110 scales down the resolution of the current original image frame to SD resolution, a phase relationship of the current original image frame may still reserved in the current low-resolution image frame. Therefore, the artifact detection unit 131 may still detect whether the current low-resolution image frame includes artifacts, and output the low-resolution weights WL. The scaling-up unit 140 may scale up the number of the low-resolution weights WL to obtain a plurality of high-resolution weights WH to be outputted to the filter unit 151. The high-resolution weights WH are in response to the result of the artifact detection performed by the artifact detection unit 131 to the current low-resolution image frame. The filter unit 151 may reduce artifact of the current original frame according to the high-resolution weights WH to obtain the adjusted image frame. Because the resolution of the original image frame may be scaled down for the artifact detection, a circuit area and a calculation complexity of the artifact detection unit 131 may be saved, and a memory space of the buffer unit 120 may also be saved.

Figure 4:
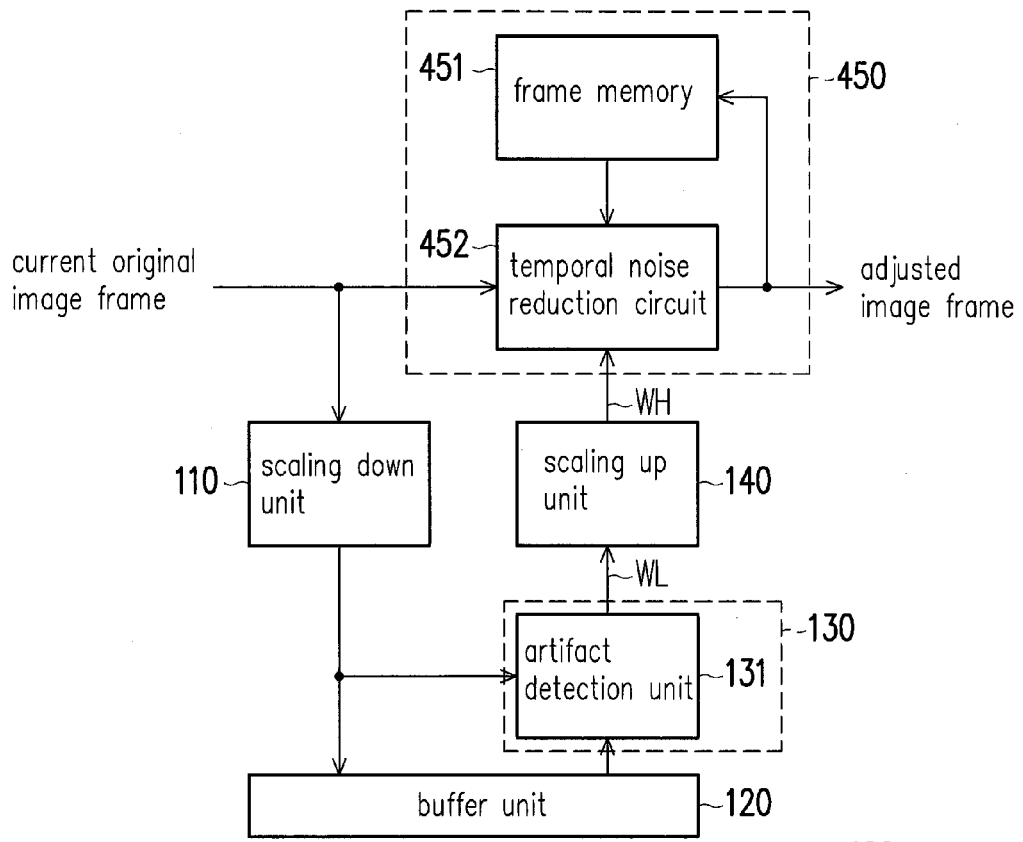
FIG. 4 is a block diagram illustrating circuitry of an artifact reduction apparatus according to another embodiment of the invention.

FIG. 4 is a block diagram illustrating circuitry of an artifact reduction apparatus 400 according to another embodiment of the invention. The artifact reduction apparatus 400 includes a scaling-down unit 110, a buffer unit 120, an artifact detection unit 131, a scaling-up unit 140 and a filter unit 450. The scaling-down unit 110, the buffer unit 120, the artifact detection unit 131 and the scaling-up unit 140 as shown in FIG. 4 may be inferred by reference with related description of FIG. 1. The scaling-down unit 100 and the filter unit 450 receive a current original image frame. The filter unit 450 may perform an image processing procedure to the current original image frame for reducing artifact of the current original image frame, and obtaining and outputting the adjusted image frame.

In the embodiment depicted in FIG. 4, the filter unit 450 includes a frame memory 451 and a temporal noise reduction (TNR) circuit 452. The frame memory 451 may temporally store the adjusted image frame and provide a previous adjusted image frame to the temporal noise reduction circuit 452. The temporal noise reduction circuit 452 is coupled to the frame memory 451 and the scaling-up unit 140. The temporal noise reduction circuit 452 may perform a temporal noise reduction to the current original image frame according to the high-resolution weights WH provided by the scaling-up unit 140 and the previous adjusted image frame provided by the frame memory 451 for reducing artifact of the current original image frame and obtaining the adjusted image frame.

For instance, for each pixel in the pixels of the current original image frame, the temporal noise reduction circuit 452 of the filter unit 450 may respectively execute following steps: calculating an equation being $Out(f)=In(f)*(1-a)+In(f-1)*a$. Therein, $Out(f)$ indicates a color or brightness value of a pixel of the adjusted image frame (e.g., the pixel $P_{i,j}$ with coordinates i,j in a $f^{th}$ adjusted image frame), $In(f)$ indicates a color or brightness value of the pixel of the current original image frame (e.g., the pixel $P_{i,j}$ with coordinates i,j in a $f^{th}$ original image frame), $In(f-1)$ indicates a color or brightness value of the pixel of the previous adjusted image frame (e.g., the pixel $P_{i,j}$ with coordinates i,j in a $(f-1)^{th}$ adjusted image frame) provided by the frame memory 451, and a indicates a color or brightness weight corresponding to the pixel in the high-resolution weights WH.

Figure 5:
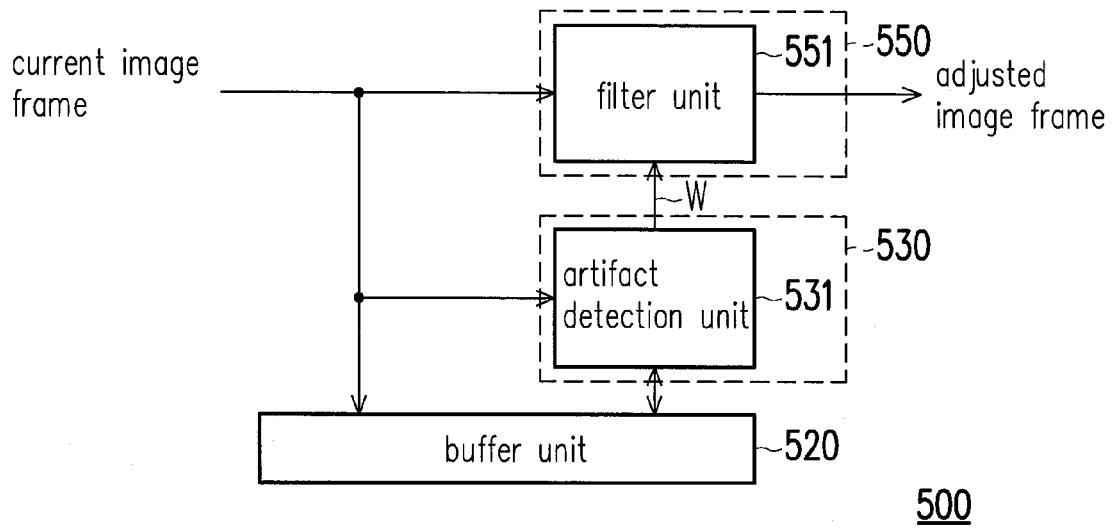
FIG. 5 is a block diagram illustrating circuitry of an artifact reduction apparatus according to yet another embodiment of the invention.

FIG. 5 is a block diagram illustrating circuitry of an artifact reduction apparatus 500 according to another embodiment of the invention. The artifact reduction apparatus 500 includes a buffer unit 520, a weight generation unit 530, and an adjusting unit 550. In the present embodiment, the weight generation unit 530 may include an artifact detection unit 531, and the adjusting unit 550 may include a filter unit 551. The buffer unit 520, the artifact detection unit 531 and the filter unit 551 as shown in FIG. 5 may be inferred by reference with related description of the buffer unit 120, the artifact detection unit 131 and the filter unit 151 in FIG. 1. The buffer unit 520 may receive and store a current image frame, and provide at least one previous image frame to the artifact detection unit 531 of the weight generation unit 530. On the other hand, the buffer unit 520 may receive and store a color or brightness weight W corresponding to the current image frame generated by the artifact detection unit 531, and provide a color or brightness weight W' corresponding the previous image frame to the artifact detection unit 531. The artifact detection unit 531 of the weight generation unit 530 is coupled to the buffer unit 520 to receive the previous image frame and the color or brightness weight W' thereof.

Figure 6:
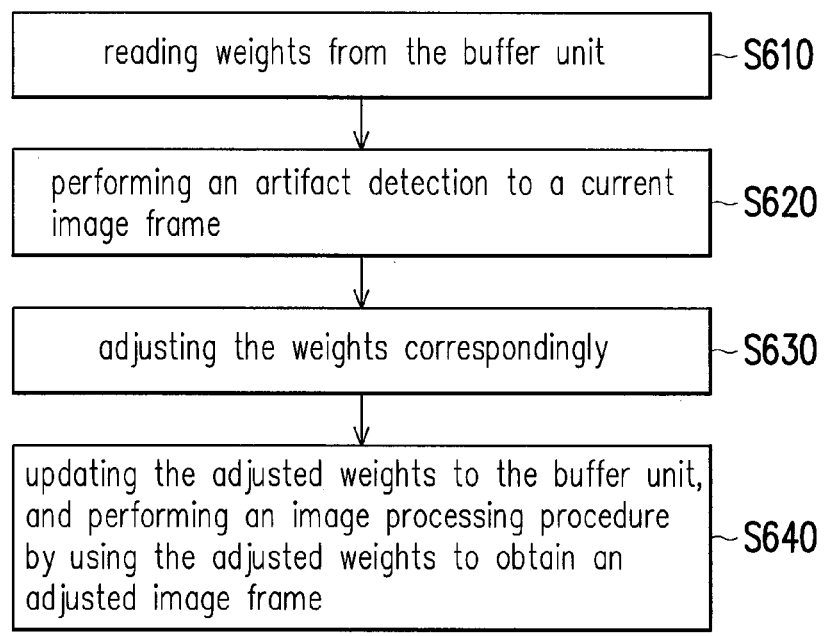
FIG. 6 is a flowchart illustrating an artifact reduction method according to yet another embodiment of the invention.

FIG. 6 is a flowchart illustrating an artifact reduction method according to yet another embodiment of the invention. Referring to FIG. 5 and FIG. 6, in step S610, the artifact detection unit 531 of the weight generation unit 530 reads one of a pixel in at least one previous image frame (e.g., the pixel with coordinates i,j in a $(k-1)^{th}$ image frame) and the color or brightness weight W' (e.g., a color weight $WC'_{i,j}$ or a brightness weight $WY'_{i,j}$) corresponding to said pixel. In step S620, the artifact detection unit 531 of the weight generation unit 530 performs an artifact detection to pixel data of said pixel in the current image frame (e.g., the pixel $P_{i,j}$ with coordinates i,j in a $k^{th}$ image frame) to obtain a detection result. For example, in step S620, the artifact detection unit 531 may perform the artifact detection in accordance with a relation of pixel data of said pixel in the current image frame and pixel data of said pixel in at least one previous image frame.

An implementation of step S620 is not particularly limited herein. In some embodiments, step S620 may include: comparing the color or brightness value of said pixel in the current image frame with the color or brightness value of said pixel in the at least one previous image frame by the artifact detection unit 531, and a comparison result thereof is used as the detection result for the artifact detection.

In step S630, the artifact detection unit 531 decides whether adjust the color or brightness weight W' (e.g., the color weight $WC'_{i,j}$ or the brightness weight $WY'_{i,j}$) corresponding to said pixel in the previous image frame. An implementation of step S630 is not particularly limited herein. In some embodiments, step S630 may include: based on the comparison result, deciding whether to adjust the color or brightness weight W' corresponding to said pixel in a plurality of weights of the at least one previous image frame (e.g., the color weight $WC'_{i,j}$ or the brightness weight $WY'_{i,j}$ corresponding to the pixel $P_{i,j}$ in the $(k-1)^{th}$ image frame), so as to generate the color or brightness weight W corresponding to said pixel in the weights of the current image frame (e.g., a color weight $WC_{i,j}$ or a brightness weight $WY_{i,j}$ corresponding to the pixel $P_{i,j}$ in the $k^{th}$ image frame).

In some embodiments, step S630 may include: if the comparison result satisfy a predetermined condition, adjusting the color or brightness weight W' corresponding to the pixel in the weights of the at least one previous image frame (e.g., the color weight $WC'_{i,j}$ and/or the brightness weight $WY'_{i,j}$ corresponding to the pixel $P_{i,j}$ in the $(k-1)^{th}$ image frame) to be served as the color or bright weight W corresponding to said pixel in the weights of the current image frame (e.g., the color weight $WC_{i,j}$ and/or the brightness weight $WY_{i,j}$ corresponding to the pixel $P_{i,j}$ in the $k^{th}$ image frame); and if the comparison result does not satisfy the predetermined condition, resetting the color or brightness weight W corresponding to the pixel in the current image frame.

Take NTSC system as an example, referring to FIG. 3 and FIG. 5, the artifact detection unit 531 may compare/analyze a relation between the three of a pixel in the current image frame (e.g., the pixel $P_{i,j}$ with coordinates i,j in the $k^{th}$ image frame 330), the same pixel in the second previous image frame (e.g., the pixel $P_{i,j}$ with coordinates i,j in the $(k-2)^{th}$ image frame 320) and the same pixel in the fourth previous image frame (e.g., the pixel $P_{i,j}$ with coordinates i,j in the $(k-4)^{th}$ image frame 310) provided by the buffer unit 520. For instance, if the relation between the three of the pixels $P_{i,j}$ in the $(k-4)^{th}$ image frame 310, the $(k-2)^{th}$ image frame 320 and the $k^{th}$ image frame 330 satisfies a sinusoid (as shown in FIG. 3), the artifact detection unit 531 may determine that the comparison result satisfies the predetermined condition.

Assuming that the pixels $P_{i,j}$ in the image frames 310, 320 and 330 include a brightness value Y, the artifact detection unit 531 may check whether the comparison result of the brightness value Y of the pixels $P_{i,j}$ in the image frames 310, 320 and 330 satisfies the predetermined condition (as shown in FIG. 3). Once the comparison result satisfies the predetermined condition, it indicates that cross-luma occurs at the pixel $P_{i,j}$ in the current image frame (e.g., the $k^{th}$ image frame 330). Therefore, when the comparison result satisfies the predetermined condition, the artifact detection unit 531 may perform calculation of $WY_{i,j}=WY'_{i,j}+inc$, wherein $WY_{i,j}$ is a brightness weight corresponding to the pixel $P_{i,j}$ in the current image frame (e.g., the $k^{th}$ image frame 330), $WY'_{i,j}$ is a brightness value corresponding to the pixel $P_{i,j}$ in the previous image frame, (e.g., the $(k-2)^{th}$ image frame 320), and inc is any real number greater than 0. In other embodiments, inc may be a real number greater than 0 and less than 1, so that the adjusted brightness weight $WY_{i,j}$ may be less than or equal to 1. The brightness value $WY_{i,j}$ may be used as a brightness component of the weights W, and the brightness weight $WY'_{i,j}$ may be used as a brightness component of the weights W'. Otherwise, if the comparison result does not satisfy the predetermined condition, the artifact detection unit 531 may perform calculation of $WY_{i,j}=ini$, wherein ini is an initial value (e.g., 0 or other real numbers).

Assuming that the pixels $P_{i,j}$ in the image frames 310, 320 and 330 include a color value C, the artifact detection unit 531 may check whether the comparison result of the color value C of the pixels $P_{i,j}$ in the image frames 310, 320 and 330 satisfies the predetermined condition (as shown in FIG. 3). Once the comparison result satisfies the predetermined condition, it indicates that cross-color occurs at the pixel $P_{i,j}$ in the current image frame (e.g., the $k^{th}$ image frame 330). Therefore, when the comparison result satisfies the predetermined condition, the artifact detection unit 531 may perform calculation of $WC_{i,j}=WC'_{i,j}+inc$, wherein $WC_{i,j}$ is a color weight corresponding to the pixel $P_{i,j}$ in the current image frame (e.g., the $k^{th}$ image frame 330), $WC'_{i,j}$ is a color value corresponding to the pixel $P_{i,j}$ in the previous image frame, (e.g., the $(k-2)^{th}$ image frame 320), and inc is any real number greater than 0. In other embodiments, inc may be a real number greater than 0 and less than 1, so that the adjusted color weight $WC_{i,j}$ may be less than or equal to 1. The color value $WC_{i,j}$ may be used as a color component of the weights W, and the color weight $WC'_{i,j}$ may be used as a color component of the weights W'. Otherwise, if the comparison result does not satisfy the predetermined condition, the artifact detection unit 531 may perform calculation of $WC_{i,j}=ini$, wherein ini is an initial value (e.g., 0 or other real numbers).

In step S640, the artifact detection unit 531 may use the adjusted color or brightness weight as a color or brightness weight W corresponding to said pixel in the current image frame (e.g., the color weight $WC_{i,j}$ or the brightness weight $WY_{i,j}$ corresponding to the pixel $P_{i,j}$ in the $k^{th}$ image frame) to be updated to the buffer unit 520. The filter unit 551 is coupled to the artifact detection unit 531. By using the adjusted color or brightness weight W provided by the artifact detection unit 531, in step S640, the filter unit 551 of the adjusting unit 550 may perform an image processing procedure to the current image frame to obtain the adjusted image frame. For instance, the filter unit 551 may perform a temporal noise reduction (TNR) to the current image frame by using the weights W for reducing artifact of the current image frame and obtaining the adjusted image frame.

Therefore, the artifact detection unit 531 may detect whether the current image frame includes artifacts, and output the weights W to the filter unit 551. The weights W are in response to the result of the artifact detection performed by the artifact detection unit 531 to the current image frame. The filter unit 551 of the adjusting unit 550 may reduce artifact of the current frame according to the weights W to obtain the adjusted image frame. Because the weight W' corresponding to the previous image frame may be reserved and superimposed, artifact may be effectively reduced.

Figure 7:
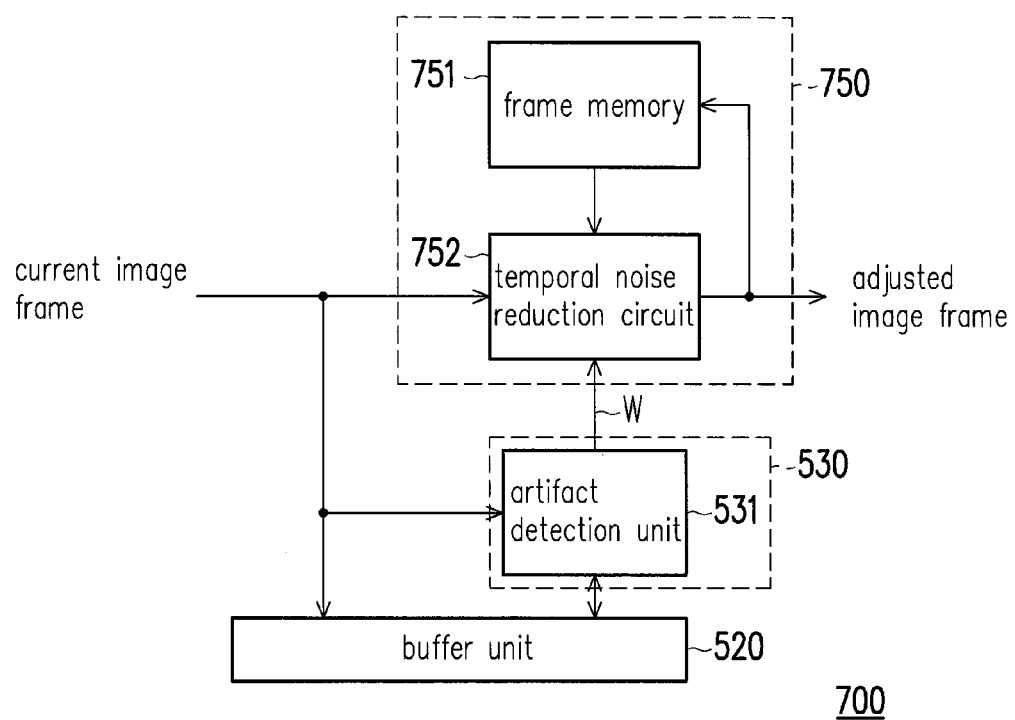
FIG. 7 is a block diagram illustrating circuitry of an artifact reduction apparatus according to another embodiment of the invention.

FIG. 7 is a block diagram illustrating circuitry of an artifact reduction apparatus 700 according to another embodiment of the invention. The artifact reduction apparatus 700 includes a buffer unit 520, an artifact detection unit 531, and an adjusting unit 551. The buffer unit 520 and the artifact detection unit 531 of FIG. 7 may be inferred by reference with related description of FIG. 5. The artifact detection unit 531 and the filter unit 750 receive a current image frame. The filter unit 750 may perform an image processing procedure to the current image frame for reducing artifact of the current image frame, and obtaining and outputting the adjusted image frame.

In the embodiment depicted in FIG. 7, the filter unit 750 includes a frame memory 751 and a temporal noise reduction (TNR) circuit 752. The frame memory 751 may temporally store the adjusted image frame outputted by temporal noise reduction circuit 752, and provide a previous adjusted image frame to the temporal noise reduction circuit 752. The temporal noise reduction circuit 752 is coupled to the frame memory 751 and the artifact detection unit 531. The temporal noise reduction circuit 752 may perform a temporal noise reduction (TNR) to the current image frame according to the color or brightness weight W provided by the artifact detection unit 531 and the previous adjusted image frame provided by the frame memory 751 for reducing artifact of the original image frame and obtaining the adjusted image frame.

For instance, for each pixel in the pixels of the current image frame, the temporal noise reduction circuit 752 of the filter unit 750 may respectively execute following steps: calculating an equation being $Out(f)=In(f)*(1-a)+In(f-1)*a$. Therein, $Out(f)$ indicates a color or brightness value of a pixel of the adjusted image frame (e.g., the pixel $P_{i,j}$ with coordinates i,j in a $f^{th}$ adjusted image frame), $In(f)$ indicates a color or brightness value of the pixel of the current image frame (e.g., the pixel $P_{i,j}$ with coordinates i,j in a $f^{th}$ original image frame), $In(f-1)$ indicates a color or brightness value of the pixel of the previous adjusted image frame (e.g., the pixel $P_{i,j}$ with coordinates i,j in a $(f-1)^{th}$ adjusted image frame) provided by the frame memory 751, and a indicates a color or brightness weight W corresponding to the pixel (e.g., the pixel $P_{i,j}$) in the weights.

In summary, because the artifact detection unit according to the embodiments of the invention is capable of reserving and superimposing the weights corresponding to the previous image frame to be used as the weights corresponding to the current image frame, artifact of the current image frame may be effectively and rapidly reduced to obtain the adjusted image frame. In addition, according to some other embodiments, because the artifact reduction apparatus and method are capable of scaling down the resolution of the original image for the artifact detection, the circuit area and the calculation complexity of the artifact detection unit may be saved, and the memory space of the buffer unit may also be saved.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. An artifact reduction method, comprising:
scaling down a resolution of each of at least one previous original image frame from a first resolution to a second resolution to obtain at least one previous low-resolution image frame and storing the at least one previous low-resolution image frame in a buffer unit;
scaling down a resolution of a current original image frame from the first resolution to the second resolution to obtain a current low-resolution image frame, wherein the current original image frame and the current low-resolution image frame comprise a first plurality of pixels and a second plurality of pixels, respectively;
  performing an artifact detection to the current low-resolution image frame to obtain a plurality of low-resolution weights in accordance with a relation of the current low-resolution image frame and the at least one previous low-resolution image frame retrieved from the buffer unit, wherein the low-resolution weights are respectively corresponding to the second plurality of pixels in the current low-resolution image frame, and the step of performing the artifact detection to the current low-resolution image frame to obtain the low-resolution weights comprises:
for each pixel in the second plurality of pixels of the current low-resolution image frame, respectively executing following steps:
  (i) comparing a color or brightness value of a pixel in the current low-resolution image frame with a color or brightness value of the pixel in the at least one previous low-resolution image frame; and
  (ii) if the comparison result satisfies a predetermined condition, adjusting a color or brightness weight corresponding to the pixel in the low-resolution weights of the at least one previous low-resolution image frame to generate the color or brightness weight corresponding to the pixel in the low-resolution weights of the current low-resolution image frame;
scaling up a number of the low-resolution weights to generate a plurality of high-resolution weights, wherein the high-resolution weights are respectively corresponding to the first plurality of pixels in the current original image frame; and
performing a temporal noise reduction to the current original image frame by using the high-resolution weights for reducing artifact of the current original image frame and obtaining an adjusted image frame, wherein the step of performing the temporal noise reduction to the current original image frame comprises:
  for each pixel in the first plurality of pixels of the current original image frame, respectively executing following steps:
    calculating a color or brightness value of a pixel in an adjusted image frame based on a color or brightness value of the pixel in the current original image frame, a color or brightness value of the pixel in a previous adjusted image frame, and a color or brightness weight corresponding to the pixel in the high-resolution weights.

2. The artifact reduction method of claim 1, wherein
if the comparison result does not satisfy the predetermined condition, resetting the color or brightness weight corresponding to the pixel in the current low-resolution image frame.

3. The artifact reduction method of claim 1, wherein the step of performing the temporal noise reduction to the current original image frame further comprises:
for each pixel in the first plurality of pixels of the current original image frame, respectively executing following steps:
calculating an equation being $Out(f)=In(f)*(1-a)+In(f-1)*a$, wherein $Out(f)$ indicates the color or brightness value of the pixel in the adjusted image frame, $In(f)$ indicates the color or brightness value of the pixel in the current original image frame, $In(f-1)$ indicates the color or brightness value of the pixel in the previous adjusted image frame, and a indicates the color or brightness weight corresponding to the pixel in the high-resolution weights.

4. An image processing method, comprising:
scaling down a resolution of each of at least one previous original image frame from a first resolution to a second resolution to obtain at least one previous low-resolution image frame and storing the at least one previous low-resolution image frame in a buffer unit;
scaling down a resolution of a current original image frame from the first resolution to the second resolution to obtain a current low-resolution image frame, wherein the current original image frame and the current low-resolution image frame comprise a first plurality of pixels and a second plurality of pixels, respectively;
  generating a plurality of low-resolution weights according to a relation of the current low-resolution image frame and the at least one previous low-resolution image frame retrieved from the buffer unit, wherein the low-resolution weights are respectively corresponding to the second plurality of pixels of the current low-resolution image frame, and the step of generating the low-resolution weights comprises:
for each pixel in the second plurality of pixels of the current low-resolution image frame, respectively executing following steps:
  (i) comparing a color or brightness value of a pixel in the current low-resolution image frame with a color or brightness value of the pixel in the at least one previous low-resolution image frame; and
  (ii) if the comparison result satisfies a predetermined condition, adjusting a color or brightness weight corresponding to the pixel in the low-resolution weights of the at least one previous low-resolution image frame to generate the color or brightness weight corresponding to the pixel in the low-resolution weights of the current low-resolution image frame;
scaling up a number of the low-resolution weights to generate a plurality of high-resolution weights, wherein the high-resolution weights are respectively corresponding to the first plurality of pixels of the current original image frame; and performing an image processing procedure to the current original image frame by using the high-resolution weights to obtain an adjusted image frame, wherein the step of performing the image processing procedure to the current original image frame comprises:

for each pixel in the first plurality of pixels of the current original image frame, respectively executing following steps:

calculating a color or brightness value of a pixel in an adjusted image frame based on a color or brightness value of the pixel in the current original image frame, a color or brightness value of the pixel in a previous adjusted image frame, and a color or brightness weight corresponding to the pixel in the high-resolution weights.

5. An artifact reduction apparatus, comprising:

a scaling-down circuitry scaling down a resolution of each of at least one previous original image frame from a first resolution to a second resolution to obtain at least one previous low-resolution image frame, and scaling down a resolution of a current original image frame from the first resolution to the second resolution to obtain and output a current low-resolution image frame, wherein the current original image frame and the current low-resolution image frame comprise a first plurality of pixels and a second plurality of pixels, respectively;

a buffer unit, coupled to the scaling-down circuitry, receiving and storing the at least one previous low-resolution image frame and the current low-resolution image frame;

an artifact detection circuitry coupled to the scaling-down circuitry and the buffer unit, wherein the artifact detection circuitry performs an artifact detection to the current low-resolution image frame to obtain and output a plurality of low-resolution weights in accordance with a relation of the current low-resolution image frame provided by the scaling-down circuitry and the at least one previous low-resolution image frame provided by the buffer unit, wherein the low-resolution weights are respectively corresponding to the second plurality of pixels in the current low-resolution image frame, and for each pixel in the second plurality of pixels of the current low-resolution image frame, the artifact detection circuitry respectively executes following steps:

(i) comparing a color or brightness value of a pixel in the current low-resolution image frame with a color or brightness value of the pixel in the at least one previous low-resolution image frame (ii) if the comparison result satisfies a predetermined condition, adjusting a color or brightness weight corresponding to the pixel in the low-resolution weights of the at least one previous low-resolution image frame to generate the color or brightness weight corresponding to the pixel in the low-resolution weights of the current low-resolution image frame;

a scaling-up circuitry coupled to the artifact detection circuitry, wherein the scaling-up circuitry scales up a number of the low-resolution weights to obtain and output a plurality of high-resolution weights, wherein the high-resolution weights are respectively corresponding to the first plurality of pixels in the current original image frame; and a filter circuitry coupled to the scaling-up circuitry, wherein the filter circuitry performs an image processing procedure to the current original image frame by using the high-resolution weights for reducing artifact of the current original image frame and obtaining an adjusted image frame, wherein for each pixel in the first plurality of pixels of the current original image frame, the filter circuitry respectively executes following steps:

calculating a color or brightness value of a pixel in an adjusted image frame based on a color or brightness value of the pixel in the current original image frame, a color or brightness value of the pixel in a previous adjusted image frame, and a color or brightness weight corresponding to the pixel in the high-resolution weights.

6. The artifact reduction apparatus of claim 5, wherein if the comparison result does not satisfy the predetermined condition, resetting the color or brightness weight corresponding to the pixel in the current low-resolution image frame.

7. The artifact reduction apparatus of claim 5, wherein for each pixel in the first plurality of pixels of the current original image frame, the filter circuitry respectively executes following steps:

calculating an equation being $Out(f)=In(f)*(1-a)+In(f-1)*a$, wherein $Out(f)$ indicates the color or brightness value of the pixel in the adjusted image frame, $In(f)$ indicates the color or brightness value of the pixel in the current original image frame, $In(f-1)$ indicates the color or brightness value of the pixel in the previous adjusted image frame, and $a$ indicates the color or brightness weight corresponding to the pixel in the high-resolution weights.

8. The artifact reduction apparatus of claim 5, wherein the filter circuitry comprises:

a frame memory configured to store the adjusted image frame and provide a previous adjusted image frame; and a temporal noise reduction circuit coupled to the frame memory, and configured to perform a temporal noise reduction to the current original image frame according to the high-resolution weights and the previous adjusted image frame for reducing artifact of the current original image frame and obtaining the adjusted image frame.

9. An image processing apparatus, comprising:

a scaling-down circuitry scaling down a resolution of each of at least one previous original image frame from a first resolution to a second resolution to obtain at least one previous low-resolution image frame, and scaling down a resolution of a current original image frame from the first resolution to the second resolution to obtain a current low-resolution image frame, wherein the current original image frame and the current low-resolution image frame comprise a first plurality of pixels and a second plurality of pixels, respectively;

a buffer unit, coupled to the scaling-down circuitry, receiving and storing the at lest one previous low-resolution image frame and the current low-resolution image frame;

a weight generation circuitry, coupled to the scaling-down circuitry and the buffer unit, generating a plurality of low-resolution weights according to a relation of the current low-resolution image frame provided by the scaling-down circuitry and the previous low-resolution image frame provided by the buffer unit, wherein the low-resolution weights are respectively corresponding to the second plurality of pixels in the current low-resolution image frame, and for each pixel in the second plurality of pixels of the current low-resolution image frame, the weight generation circuitry respectively executes following steps:

(i) comparing a color or brightness value of a pixel in the current low-resolution image frame with a color or brightness value of the pixel in the at least one previous low-resolution image frame (ii) if the comparison result satisfies a predetermined condition, adjusting a color or brightness weight corresponding to the pixel in the low-resolution weights of the at least one previous low-resolution image frame to generate the color or brightness weight corresponding to the pixel in the low-resolution weights of the current low-resolution image frame;

a scaling-up circuitry scaling up a number of the low-resolution weights to generate a plurality of high-resolution weights, wherein the high-resolution weights are respectively corresponding to the first plurality of pixels in the current original image frame; and an adjusting circuitry performing an image processing procedure to the current original image frame by using the high-resolution weights to obtain an adjusted image frame, wherein for each pixel in the first plurality of pixels of the current original image frame, the adjusting circuitry respectively executes following steps:

calculating a color or brightness value of a pixel in an adjusted image frame based on a color or brightness value of the pixel in the current original image frame, a color or brightness value of the pixel in a previous adjusted image frame, and a color or brightness weight corresponding to the pixel in the high-resolution weights.

* * * * *